(12) United States Patent
Kim (10) Patent No.: US 9,019,409 B2
(45) Date of Patent: Apr. 28, 2015

(54) IMAGE SENSING DEVICE AND METHOD FOR OPERATING THE SAME

(75) Inventor: Eun Jun Kim, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 103 days.

(21) Appl. No.: 13/294,312

(22) Filed: Nov. 11, 2011

(65) Prior Publication Data

US 2012/0120290 A1    May 17, 2012

(30) Foreign Application Priority Data

Nov. 17, 2010  (KR) .................. 10-2010-0114710

(51) Int. Cl.
*H04N 5/378* (2011.01)
*H04N 5/357* (2011.01)

(52) U.S. Cl.
CPC ............. *H04N 5/378* (2013.01); *H04N 5/3575* (2013.01)

(58) Field of Classification Search
CPC ............................ H04N 5/378; H04N 5/3575
USPC ........... 348/294, 302, 308; 341/155; 257/291, 257/292
See application file for complete search history.

(56) References Cited

U.S. PATENT DOCUMENTS

2005/0195304 A1* 9/2005 Nitta et al. .................... 348/308

FOREIGN PATENT DOCUMENTS

KR  1020070063215 A  6/2007
KR  1020080037933 A  5/2008

* cited by examiner

*Primary Examiner* — Paul Berardesca
(74) *Attorney, Agent, or Firm* — William Park & Associates Ltd.

(57) ABSTRACT

An image sensing device includes, inter alia, a ramp signal generation unit generating a ramp signal that decreases during first and second periods for finding data values corresponding to a pixel signal and an offset value, respectively. The image sensing device also includes a comparison unit compares the pixel signal with the ramp signal during the first period, and compares the ramp signal with an internally generated offset value during the second period. A first counting unit is configured to perform a counting operation during the first period, and a second counting unit configured to latch a count value of the first counting unit as a data value in response to the result of the first comparison operation during the first period, perform a down-count operation from the latched data value in response to the result of the second comparison operation during the second period, and latch a counting result.

6 Claims, 9 Drawing Sheets

IMAGE SENSING DEVICE AND METHOD FOR OPERATING THE SAME

CROSS-REFERENCE(S) TO RELATED APPLICATIONS

The present application claims priority of Korean Patent Application No. 10-2010-0114710, filed on Nov. 17, 2010, which is incorporated herein by reference in its entirety.

BACKGROUND OF THE INVENTION

Exemplary embodiments of the present invention relate to an image sensing device and a method for operating the same, and more particularly, to an image sensing device that can operate an exact correlated double sampling (CDS) operation and reduce power consumption, and a method for operating the same.

Exemplary embodiments of the present invention relate to an image sensing device, and more particularly, to a circuit for handling an image signal provided from a pixel.

An image sensing device such as a portable camera or a digital camera typically generates images of the world. Examples of a sensing element provided in an image sensing device include a CMOS image sensor and a charge coupled device (CCD) image sensor. A CMOS image sensor or CCD image sensor has a pixel array that respond to light for capturing images.

Each subject in the natural world corresponds to a brightness and wavelengths of light. Each pixel of an image sensor extracts an electrical value from sensing of the brightness and the wavelengths. The electrical value is converted into an electrical voltage that can be processed in the image sensor. An image sensor includes an analog-to-digital (A/D) converter which converts analog voltages sensed by the pixel array into digital values and a memory for use during signal processing.

A pixel array includes a plurality of pixels arranged in a matrix form of columns and of rows. An image sensing device usually processes image data provided from a pixel array with reference to a column. Internal circuits of the image sensing device are designed in terms of the columns of the pixel array.

A data processing unit which processes each column data performs an A/D conversion operation of converting an analog signal into a digital signal, and a CDS operation of removing an offset value. In the CDS operation, a digital value corresponding to an analog value provided from a pixel is calculated, and an offset value included in the digital value is removed.

A counter and a latch corresponding to each column are arranged for converting an analog value into a digital value. Since the counter consumes a relatively large amount of current during operation, the counters consume a large amount of current during data processing.

SUMMARY OF THE INVENTION

An embodiment of the present invention is directed to an image sensing device, which can perform an exact CDS operation and reduce power consumption, and a method for operating the same.

In accordance with an embodiment of the present invention, an image sensing device includes a ramp signal generation unit configured to generate a ramp signal that decreases during a first period for finding a data value corresponding to a pixel signal provided from a pixel and a second period for finding an offset value, a comparison unit configured to perform a first comparison operation of comparing the pixel signal with the ramp signal during the first period, and a second comparison operation of comparing the ramp signal with an internally generated offset value during the second period, a first counting unit configured to perform an up-count operation during the first period, and a second counting unit configured to latch a count value of the first counting unit as a data value in response to the result of the first comparison operation during the first period, perform a down-count operation from the latched data value in response to the result of the second comparison operation during the second period, and latch a counting result.

In accordance with another embodiment of the present invention, an image sensing device includes, a first counting unit configured to perform a counting operation according to a magnitude of a pixel signal corresponding to light incident onto a pixel, a second counting unit configured to perform a down-count operation on a first count value provided from the first counting unit by an offset value of the image sensing device, and an image implementing circuit configured to reproduce an image using a down-counted value of the second counting unit as data.

In accordance with another embodiment of the present invention, a method for operating an image sensing device includes: starting to perform a counting operation in response to a falling of a ramp signal in a first period; latching a count value at a time point at which the ramp signal becomes substantially equal to a pixel signal provided from a pixel in the first period; changing the count value by an offset value of the image sensing device in response to a falling of the ramp signal in a second period; and reproducing an image using data corresponding to the changed count value.

In accordance with another embodiment of the present invention, an image sensing device includes: a ramp signal generation unit configured to generate a ramp signal which falls down during a first period for finding a data value corresponding to a pixel signal provided from a pixel and a second period for finding an offset value; a comparison unit configured to perform a first comparison operation of comparing the pixel signal with the ramp signal during the first period, and a second comparison operation of comparing the ramp signal with an internally generated offset value during the second period; a first counting unit configured to perform a counting operation during the first period; and a latch unit configured to latch a count value of the first counting unit as a data value in response to the result of the first comparison operation, change the latched data value according to the result of the second comparison operation, and again latch the changed data vale.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
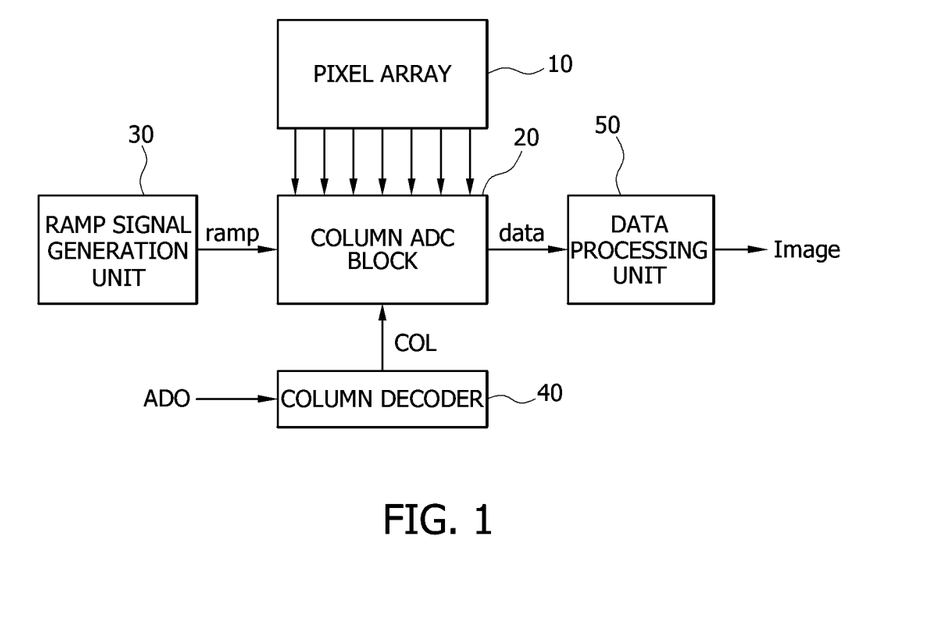
FIG. 1 is a block diagram illustrating an image sensing device, which is presented for explaining the present invention.

FIG. 1 is a block diagram illustrating an image sensing device, which is presented for explaining the present invention.

Referring to FIG. 1, the image sensing device includes a pixel array 10, a column ADC block 20, a ramp signal generation unit 30, a column decoder 40, and a data processing unit 50. The pixel array 10 includes a plurality of pixels arranged in a matrix form. A single pixel may include four or three transistors (not shown) and a photodiode (not shown). The photodiode is an element which accumulates electrons corresponding to incident light, and the plurality of transistors provided in the pixel output a signal corresponding to the accumulated electrons. In the pixel array 10, a plurality of pixels is arranged in columns and rows in a matrix form. Signals outputted from the respective pixels are processed in units of columns.

The column ADC block 20 includes as many comparison units and latch units as the number of the columns provided in the pixel array 10. The ramp signal generation unit 30 generates a ramp signal ramp where the level of the ramp signal ramp decreases at a constant rate during a predefined period, and provides the ramp signal ramp to the column ADC block 20. The column decoder 40 receives an address signal ADD and provides a decoded signal COL to the column ADC block 20. The data processing unit 50 processes data outputted from the column ADC block 20 and generates an image signal.

Figure 2:
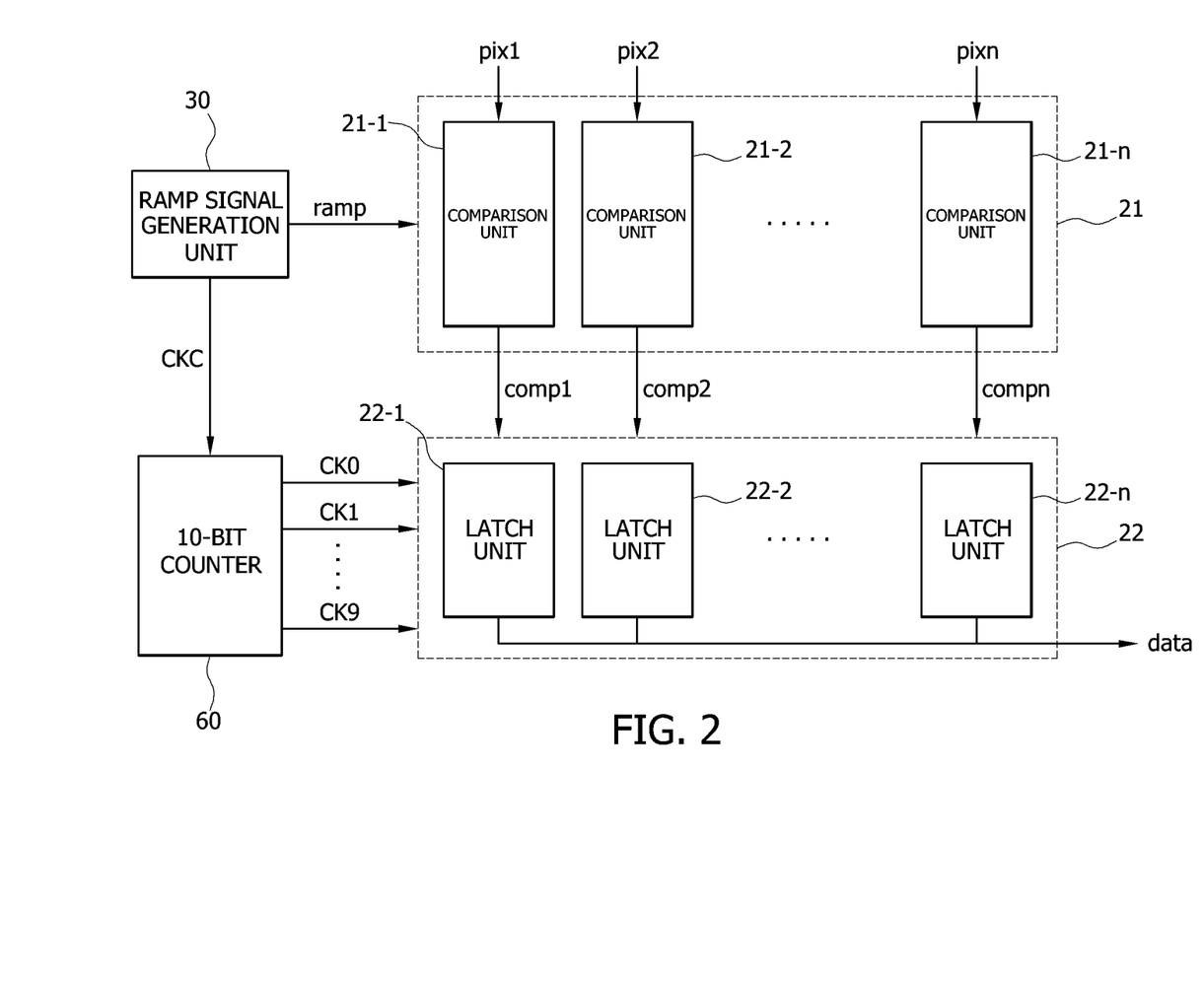
FIG. 2 is a block diagram illustrating a column ADC block and its peripheral circuit in the image sensing device of FIG. 1.

FIG. 2 is a block diagram illustrating the column ADC block and its peripheral circuit in the image sensing device of FIG. 1.

Referring to FIG. 2, the column ADC block 20 includes a comparison block 21 and a latch block 22. The comparison block 21 includes as many comparison units 21-1 to 21-$n$ as the number of columns of the pixel array 10. The latch block 22 includes as many latch units 22-1 to 22-$n$ as the number of columns of the pixel array 10.

Each comparison unit (for example, 21-1) compares a signal pix1 provided from the corresponding column of the pixel array 10 with a ramp signal ramp, and outputs a comparison signal (for example, comp1). A 10-bit counter 60 starts to perform a counting operation when the ramp signal ramp outputted from the ramp signal generation unit 30 starts to decrease. To this end, the ramp signal generation unit 30 generates a count start signal CKC when the ramp signal ramp first starts to decrease, and outputs the counting start signal CKC to the 10-bit counter 60. Each latch unit (for example, 22-1) latches a count signal CK0-CK9, which is provided from the 10-bit counter 60, in response to a corresponding comparison signal comp1-compn.

Figure 3:
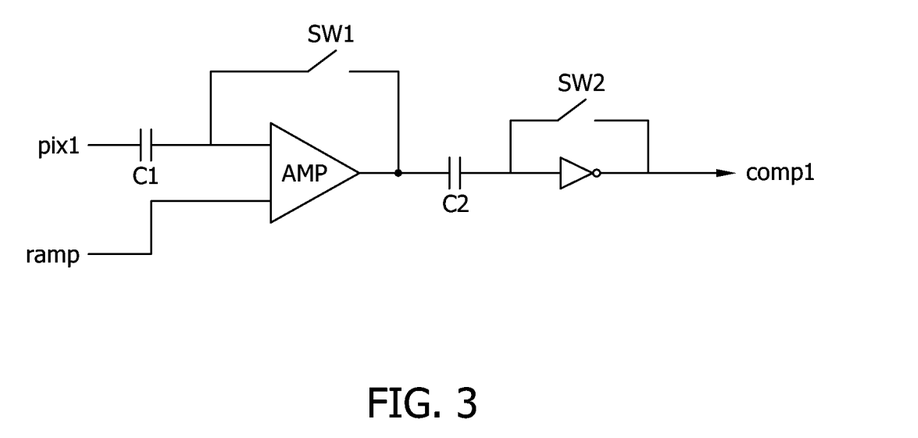
FIG. 3 is a circuit diagram illustrating a comparison unit of FIG. 2.

FIG. 3 is a circuit diagram illustrating the comparison unit of FIG. 2.

Referring to FIG. 3, the comparison unit includes a capacitor C1, a comparator AMP, a capacitor C2, an inverter, and switches SW1 and SW2. The comparison unit illustrated in FIG. 2 may be configured in various ways. One exemplary configuration is illustrated in FIG. 3. The comparison unit compares the pixel signal pix1 with the ramp signal ramp, and outputs the comparison signal comp1 corresponding to a comparison result. The level of the ramp signal ramp decreases from a predefined level at a constant rate during a predefined period. The pixel signal pix1 has a signal value corresponding to an amount of electrons accumulated according to light incident onto the corresponding pixel. Therefore, there occurs a moment when the ramp signal ramp is equal to the pixel signal pix1. The comparator AMP detects this moment and activates the comparison signal comp1.

Figure 4:
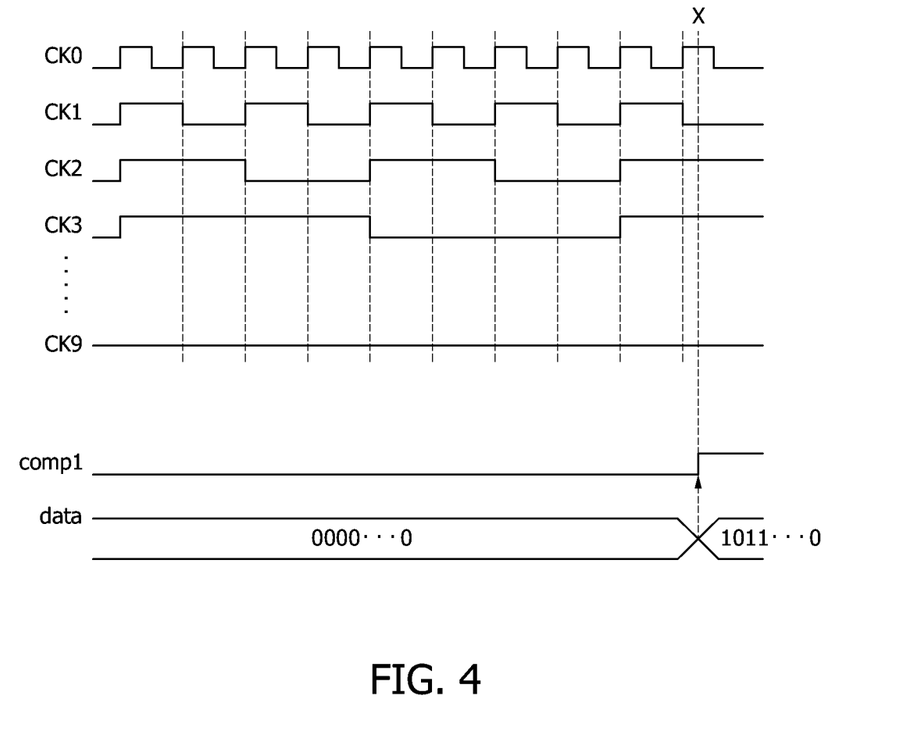
FIG. 4 is a timing diagram illustrating the operation of the column ADC block of FIG. 2.

FIG. 4 is a timing diagram illustrating the operation of the column ADC block of FIG. 2.

Referring to FIG. 4, the 10-bit counter 60 performs a counting operation in response to the counting start signal CKC, and provides the respective latch units 22-1 to 22-$n$ with 10-bit output values CK0 to CK9. Each latch unit (for example, 22-1) latches the count value provided at the activation time point of the comparison signal (for example, comp1) outputted from the corresponding comparison unit 21-1. For example, a value of "1011 . . . 0" is latched at a time point X. The latched value is outputted as data.

As such, when the image sensing device processes data in units of columns, the counter is provided outside the column ADC block and receives the count value. Thus, the counting is not performed inside the column ADC block. Hence, the power consumption of the column ADC block can be remarkably reduced. In addition, even though the speed of an operating clock can be increased to increase resolution of the image sensing device, power consumed during the signal processing does not rapidly increase.

However, since the CDS operation is not performed effectively, a column fixed pattern noise (CFPN) problem may occur. The CDS operation refers to a sampling operation which is performed twice in order to remove an offset value occurring when a signal provided from a pixel is converted into a data value. The CFPN refers to a noise generated by an offset of a circuit provided at each column when an image is reproduced. To solve this problem, the image sensing device which can effectively perform the CDS operation will be described below.

Figure 5:
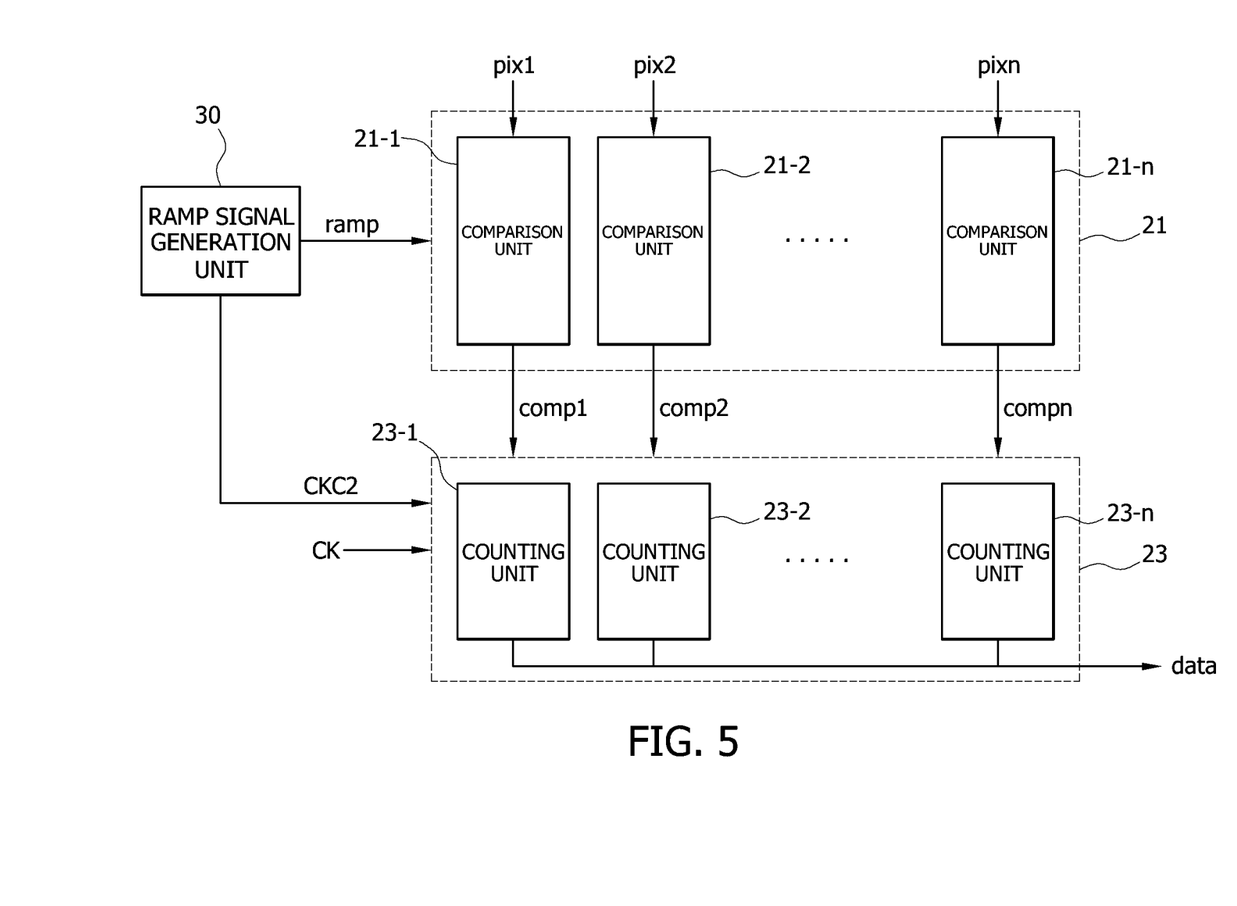
FIG. 5 is a block diagram illustrating another example of a column ADC block in the image sensing device.

FIG. 5 is a block diagram illustrating another example of a column ADC block in the image sensing device.

In the column ADC block illustrated in FIG. 5, the 10-bit counter is not provided outside the column ADC block, but counting units 23-1 to 23-$n$ are disposed corresponding to the comparison units 21-1 to 21-$n$. Therefore, instead of receiving the external count values, the counting operation is performed in response to a counting start signal CKC2 provided from the ramp signal generation unit 30. Each counting unit counting units 23-1 to 23-$n$ counts until a corresponding comparison signal comp1-cmpn is provided. The count is then latched, and the latched value is outputted as data.

Figure 6:
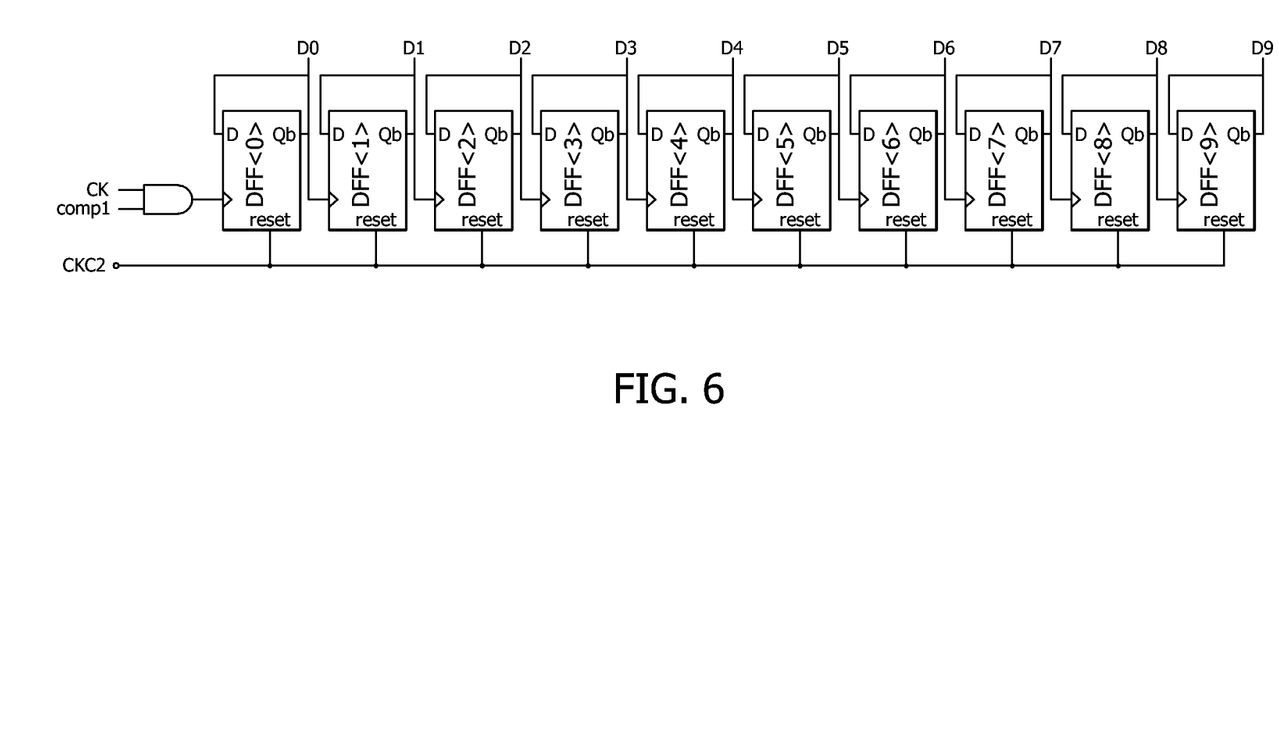
FIG. 6 is a circuit diagram illustrating a counting unit of FIG. 5.

FIG. 6 is a circuit diagram illustrating an example of the counting unit provided in the column ADC block of FIG. 5. Ten flip-flops are connected in series and are reset in response to the counting start signal CKC2 to start to perform a counting operation. When the comparison signal comp1 is deactivated to a high level, a clock signal CK is transferred to the flip-flop. When the comparison signal comp1 is activated to a low level, the clock signal CK is not transferred to the flip-flop, so that the counting operation is not performed any more.

Figure 7:
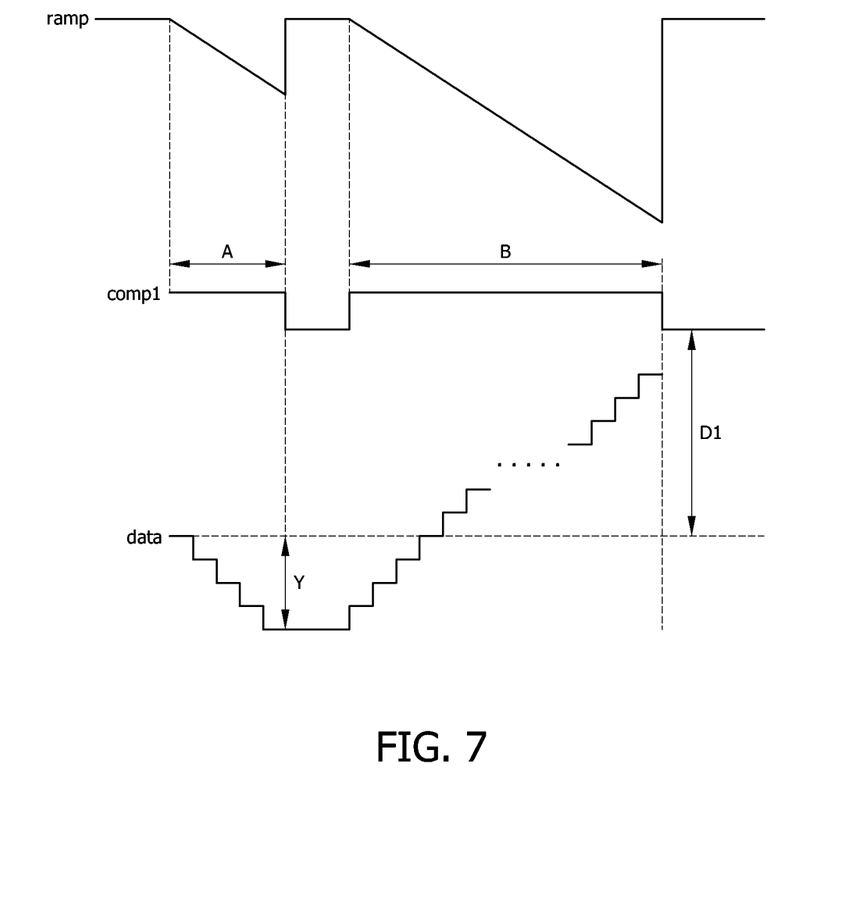
FIG. 7 is a waveform diagram illustrating the operation of the column ADC block of FIG. 5.

FIG. 7 is a waveform diagram illustrating the operation of the column ADC block of FIG. 5.

Referring to FIG. 7, the counting unit (for example, 23-1) starts to perform a counting operation in response to the counting start signal CKC2 during a period A where the ramp signal ramp decreases. At that time, a count value has effectively a minus value. During this period, a constant voltage is generated at an input terminal to which the pixel signal pix1 is inputted, because of an offset of the comparison unit 21-1 itself. Due to the offset, the comparison unit 21-1 activates the comparison signal comp1 to a high level. A value counted by the counting unit 23-1 until the comparison signal comp1 is activated to a high level becomes an offset value Y.

Then, when the pixel signal pix1 is provided, the ramp signal ramp decreases, and the comparison unit 21-1 compares the pixel signal pix1 with the ramp signal ramp and outputs the comparison signal comp1. During the period B when the ramp signal ramp starts to decrease, the counting unit 23-1 counts from the offset value Y. When the counting unit 23-1 finishes counting, the count value has a plus value. A value D1 counted by the counting unit 23-1 from the time point at which the comparison signal comp1 is activated to a high level is outputted as data. Accordingly, by having the counting unit 23-1 count down the offset value Y, the counting unit 23-1 obtains a difference in count value D1 between the pixel signal pix1 and the offset value Y without performing a separate minus operation.

As described above with reference to FIGS. 5 to 7, the image sensing device can easily perform the CDS operation, but the counters are required at each column. Therefore, since the counting operation is performed at each column, too much current is consumed when finding data corresponding to all pixels of the pixel array.

The present invention is directed to an image sensing device which can perform an exact CDS operation and remarkably reduce current consumption.

Figure 8:
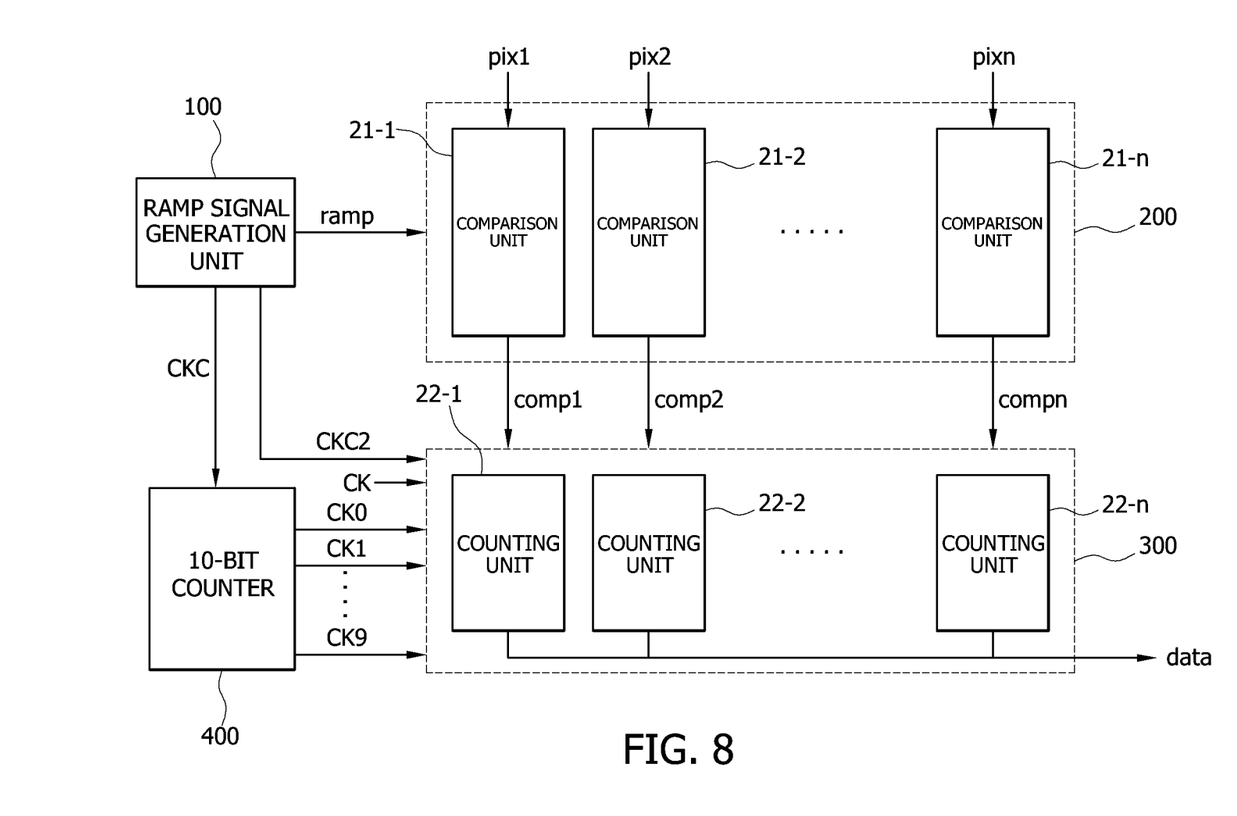
FIG. 8 is a block diagram illustrating an image sensing device in accordance with an embodiment of the present invention.

FIG. 8 is a block diagram illustrating an image sensing device in accordance with an embodiment of the present invention.

Referring to FIG. 8, the image sensing device in accordance with the embodiment of the present invention includes a ramp signal generation unit 100, a comparison block 200, a counting block 300, and a 10-bit counter 400. The comparison block 200 includes a plurality of comparison units 21-1 to 21-n corresponding to columns provided in a pixel array. The counting block 300 includes a plurality of counting units 22-1 to 22-n corresponding to the plurality of comparison units 21-1 to 21-n. The ramp signal generation unit 100 generates a ramp signal ramp which decreases during a first period and a second period. The first period is a period for finding data values corresponding to pixel signals pix1 to pixn provided from pixels, and the second period is a period for finding an offset value.

The comparison unit (for example, 21-1) performs a first comparison operation of comparing the pixel signal pix1 with the ramp signal ramp during the first period, and a second comparison operation of comparing the ramp signal ramp with an internally generated offset voltage during the second period. The 10-bit counter 400 outputs a 10-bit signal and starts to perform a counting operation in response to a control signal CKC provided from the ramp signal generation unit 100.

The counting unit (for example, 22-1) latches a count value of the first counter as a data value in response to the result of the first comparison operation during the first period, performs a down-count operation from the latched data value in response to the result of the second comparison operation during the second period, and latches the counting result.

The image sensing device in accordance with the embodiment of the present invention includes two kinds of counters. The 10-bit counter 400 serves as the first counter, and the counting units 22-1 to 22-n provided in the counting block 300 serve as the second counter. Accordingly, the second counter counts down the offset from the count of the first counter.

Figure 9:
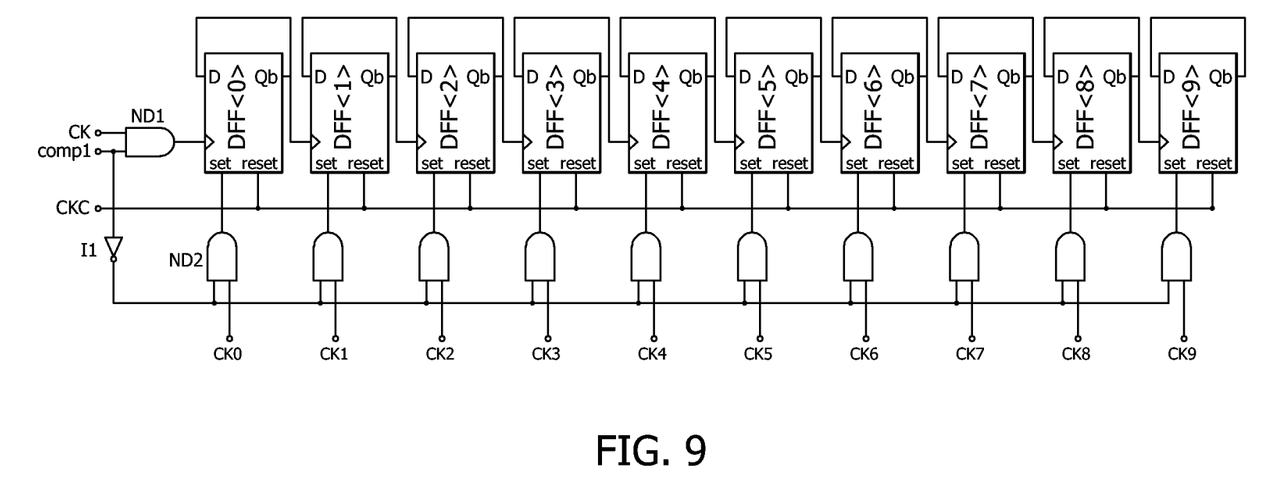
FIG. 9 is a circuit diagram illustrating a counting unit of FIG. 8.

FIG. 9 is a circuit diagram illustrating the counting unit of FIG. 8.

Referring to FIG. 9, the counting unit includes ten flip-flops, a first AND gate ND1, an inverter I1, and ten second AND gates ND2. The first AND gate ND1 performs an AND operation on a clock signal CK and the comparison result signal comp1 provided during the first and second comparison operations, and outputs an AND operation result to a clock input terminal of the first flip-flop among the ten flip-flops. The inverter I1 inverts the comparison result signal comp1 provided during the first and second comparison operations. The ten second AND gates ND2 perform AND operations on the inverted comparison result signal and counting signals CK0 to CK9 provided from the 10-bit counter 400, and provide the AND operation results to set terminals of the corresponding flip-flops, respectively.

The ten flip-flops are connected in series. The phrase "connected in series" means that a Qb output terminal of a certain stage is connected to a clock input terminal of a next stage. The Qb output terminals of the flip-flops are connected to data input terminals D thereof. The reset terminals of the ten flip-flops receive the control signal CKC provided from the ramp signal generation unit 100.

Figure 10:
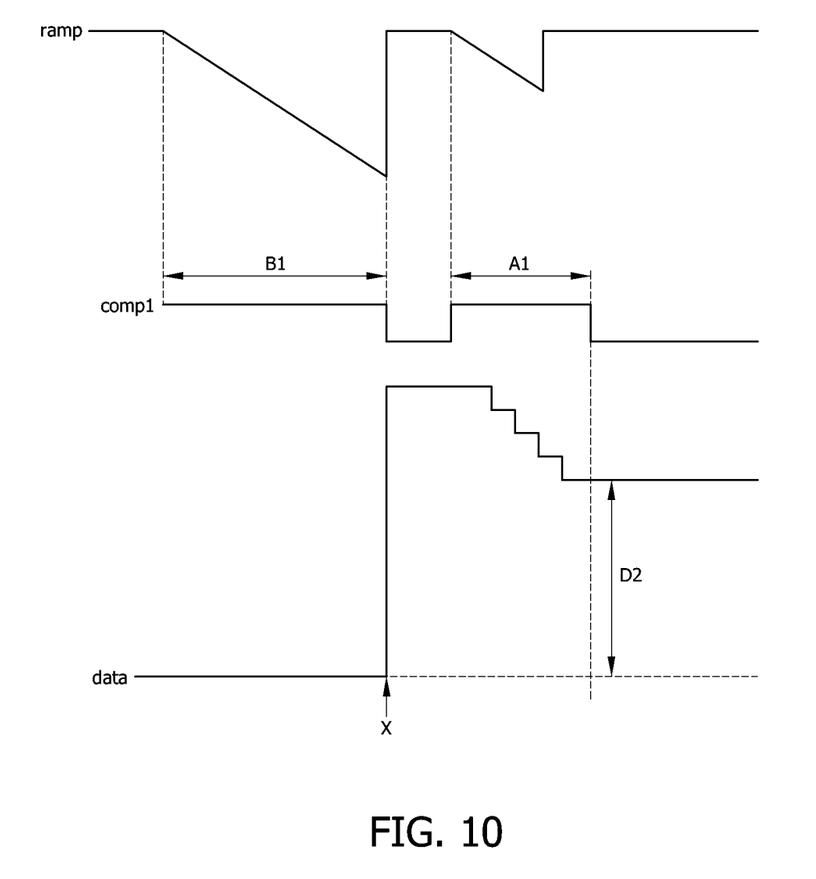
FIG. 10 is a timing diagram illustrating the operation of the image sensing device of FIG. 8.

FIG. 10 is a waveform diagram illustrating the operation of the image sensing device of FIG. 8. The operation of the image sensing device in accordance with the embodiment of the present invention will be described below with reference to FIGS. 8 to 10.

First, the ramp signal generation unit 100 of the image sensing device in accordance with the embodiment of the present invention outputs the ramp signal ramp two times. The ramp signal ramp is a signal which falls down at a constant ratio. The first output is defined as a first period B1 and the second output is defined as a second period A1. During the first period B1, the pixel signal pix1 having information corresponding to incident light is provided to the comparison block 200. During the first period B1, the comparison unit 21-1 compares the pixel signal pix1 with the ramp signal ramp. During the second period A1, the comparison unit 21-1 compares the offset value with the ramp signal ramp.

When the ramp signal generation unit 100 outputs the ramp signal ramp during the first period B1, the 10-bit counter starts to count in response to the falling of the ramp signal ramp. The comparison signal comp1 is activated at a time point at which the ramp signal ramp becomes substantially equal to the pixel signal pix1 provided from the pixel during the first period B1. Accordingly, the count value of the 10-bit counter is latched in the counting unit 22-1 using the comparison signal comp1.

Then, when the ramp signal generation unit 100 outputs the ramp signal ramp during the second period A1, the counting unit 22-1 performs a down-count operation from the latched value in response to the falling of the ramp signal ramp. During the second period A1, the comparison unit compares the offset value with the ramp signal ramp, and activates the comparison signal comp1 at a time point at which the offset value becomes substantially equal to the ramp signal ramp. The down-count operation is performed until the comparison signal comp1 is activated, and the value counted at that time becomes actual data D2 from which an offset is removed. The data D2 is used to reproduce an image.

In the above-described image sensing device, the 10-bit counter performs the counting operation during the period where the pixel signal pix1 is compared with the ramp signal ramp, and the respective counting units provided in the counting block 300 perform the offset value counting operation.

In this case, a lot of counting operations are required during the period where the pixel signal pix1 is compared with the ramp signal ramp. Thus, a large amount of a current is consumed. However, in the image sensing device in accordance with the embodiment of the present invention, the counting block does not perform a counting operation during this period, and a single counter provided outside the counting block performs a counting operation in a batch manner and provides the count value to the respective counting units 22-1 to 22-n. Then, the operation of removing the offset value is performed by the down-count operations of the counting units. Hence, the CDS operation can be performed reliably and stably, without greatly increasing current consumption.

Therefore, in the image sensing device in accordance with the embodiment of the present invention, the counting operation on the pixel signal is performed by the single counter. Thus, current consumption can be remarkably reduced, as compared to the case of FIG. 5 in which the respective counting units perform the counting operations. Even though the clock speed is increased due to the increase of resolution, little power consumption is added. Since the offset value is directly removed in each column during the operation procedure, CFPN characteristic can be improved. That is, the image sensing device in accordance with the embodiment of the present invention is implemented to have the respective advantages suggested in FIGS. 2 and 5.

The image sensing device can be implemented as illustrated in FIG. 8, and may be implemented in other structures. For example, two counters may be provided. In this case, the first counter performs a counting operation according to the magnitude of the pixel signal corresponding to light incident onto the pixel, and the second counter performs a down-count operation on a first count value, which is provided from the first counter, by an offset of the image sensing device. Then, an image is reproduced using the down-counted value from the second counter as data.

According to another method, instead of performing the down-count operation, the value corresponding to the offset value is calculated, and a difference between the previously obtained data value and the offset value is calculated. Then, the calculated difference value is used to reproduce an image.

In accordance with the embodiments of the present invention, the image sensing device can stably perform the CDS operation and can remarkably reduce the power consumption.

While the present invention has been described with respect to the specific embodiments, it will be apparent to those skilled in the art that various changes and modifications may be made without departing from the spirit and scope of the invention as defined in the following claims.

What is claimed is:

1. An image sensing device comprising:
a ramp signal generation unit configured to generate a ramp signal decreasing during a first period for finding a data value corresponding to a pixel signal provided from a pixel and decreasing during a second period for finding an offset value, and generate a control signal;
a plurality of comparison units, each configured to perform a first comparison operation of comparing the pixel signal with the ramp signal during the first period, and a second comparison operation of comparing the ramp signal with an internally generated offset value during the second period;
a first single counting unit configured to receive the control signal from the ramp signal generation unit, and perform an up-count operation during the first period in response to the control signal; and
a plurality of second counting units, each configured to latch a count value of the single first counting unit as a data value in response to a comparison result of the first comparison operation during the first period, and perform a down-count operation from a latched data value in response to a comparison result of the second comparison operation during the second period,
wherein the single first count unit provides the count value to each of the plurality of second counting units, and
wherein a counting operation of the pixel signal is performed by only the single first counting unit, and a counting operation of the offset value is performed by each of the plurality of second counting units.

2. The image sensing device of claim 1, wherein the down-count operation stops in response to the result of the second comparison operation during the second period.

3. The image sensing device of claim 1, wherein a number of the plurality of comparison units and a number of the plurality of second counting units correspond to a number of a plurality of columns of a pixel array that provide the pixel signal.

4. The image sensing device of claim 1, wherein each of the plurality of second counting units comprises:
N flip-flops connected in series;
a first AND gate configured to receive a clock signal and the comparison result signal provided during the first and second comparison operations and output a logic operation result to a clock input terminal of a first flip-flop among the N flip-flops;
an inverter configured to invert the comparison result signal provided during the first and second comparison operations; and
N second logic AND gates configured to receive N counting signals provided from the single first counting unit and provide logic operation results to set terminals of corresponding flip-flops.

5. An image sensing device comprising:
a ramp signal generation unit configured to generate a ramp signal that decreases during a first period for finding a data value corresponding to a pixel signal provided from a pixel and a ramp signal that also decreases during a second period for finding an offset value and generate a control signal;
a plurality of comparison units, each configured to perform a first comparison operation of comparing the pixel signal with the ramp signal during the first period, and a second comparison operation of comparing the ramp signal with an internally generated offset value during the second period;

a single first counting unit configured to receive the control signal from the ramp signal generation unit, and perform a counting operation during the first period in response to the control signal; and a latch unit configured to latch a count value of the single first counting unit as a first data value in response to a comparison result of the first comparison operation, change the first data value according to a comparison result of the second comparison operation, and again latch a changed data value as a second data value, wherein the latch unit comprises a plurality of second counting units, each configured to perform a down-count operation on the first data value, and latch second data value in response to the comparison result of the second comparison operation, and wherein the single first count unit provides the count value to each of the plurality of second counting units, and wherein a counting operation on the pixel signal is performed by only the single first counting unit, and a counting operation of the offset value is performed by each of the plurality of second counting units.

6. The image sensing device of claim 5, wherein the latch unit is configured to latch the second data value obtained by subtracting a value derived by the second comparison operation from the first data value.

* * * * *